H. L. HASKELL.
WOODEN INSOLE.
APPLICATION FILED FEB. 26, 1919.

1,411,021.  Patented Mar. 28, 1922.

Witness:
Harry S. Gaither

Inventor:
H. L. Haskell,
by Chamberlin Freudenreich
Attys

UNITED STATES PATENT OFFICE.

HENRY L. HASKELL, OF LUDINGTON, MICHIGAN, ASSIGNOR TO HASKELITE MANUFACTURING CORPORATION, A CORPORATION OF NEW YORK.

WOODEN INSOLE.

1,411,021. Specification of Letters Patent. Patented Mar. 28, 1922.

Application filed February 26, 1919. Serial No. 279,369.

*To all whom it may concern:*

Be it known that I, HENRY L. HASKELL, a citizen of the United States, residing at Ludington, county of Mason, State of Michigan, have invented a certain new and useful Improvement in Wooden Insoles, and declare the following to be a full, clear, and exact description of the same, such as will enable others skilled in the art to which it pertains to make and use the same, reference being had to the accompanying drawings, which form a part of this specification.

What may be termed the foundation of a shoe is the insole. In the higher grade welt shoes this insole is usually made of a good quality of leather not less than about one-eighth of an inch thick which is then channeled to produce a lip or projection to which the welt is stitched. In cheaper soles, the insole has for a body a thick piece of paper or fiber to which is stitched the lip or projection to which the welt is adapted to be attached; the stitches on the upper side of the insole being covered in some way, usually by means of a thin layer of leather. Both of these types of insoles are affected by moisture and particularly by perspiration and become brittle and crack and do not retain their initial shapes for any considerable length of time.

The object of the present invention is to produce a simple insole which will not be affected by perspiration or other moisture and which will retain its initial shape and other characteristics throughout the life of a shoe.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1:
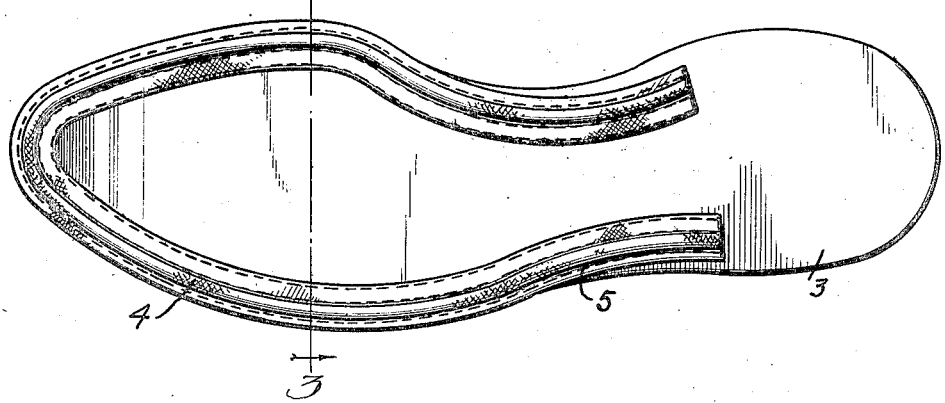
Figure 1 is a bottom plan view of a sole arranged in accordance with a preferred form of my invention.
Figure 2:
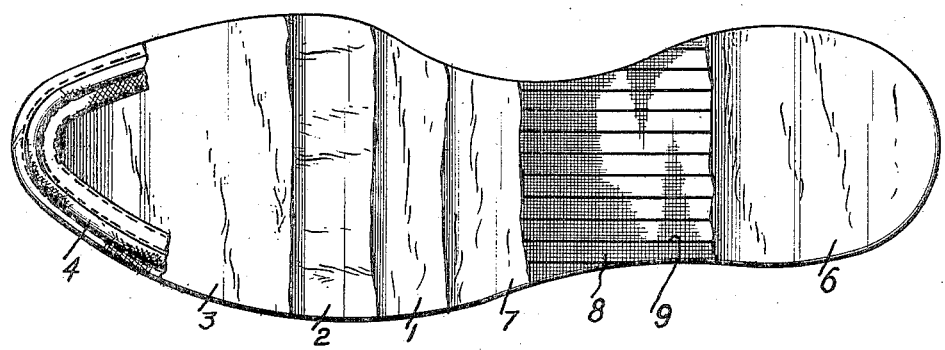
Fig. 2 is a view similar to Fig. 1, successive layers being broken away to show the nature of each of the several layers of which the insole is composed.
Figure 3:
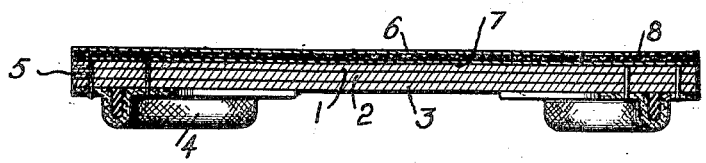
Fig. 3 is a transverse section taken approximately on line 3—3 of Fig. 1, the thicknesses of the various parts being greatly exaggerated for the sake of clearness.

In carrying out my invention I make use of the practice now followed in making cheap insoles, but employ materials which are not only much superior to the materials that are employed for that purpose but are actually superior to leather.

The body of the insole is made up of multiple ply or laminated wood veneer. In the arrangement shown, such body member is made of three layers of veneer, 1, 2 and 3, so disposed that there is a crossing of the grain and thus no chance for the composite member to split. Thus, in the arrangement shown, the grain in the layers 1 and 3 is transverse while the grain in the layer 2 is longitudinal. The several layers or sheets of veneer are glued together by means of a waterproof glue, preferably a blood glue, being thus a material of the kind disclosed in my prior application Serial No. 213,891, filed January 26, 1918. The veneer may be made very thin so that a three-ply member need not have a thickness of more than one-sixteenth of an inch, if so thin a body member be desired. A lip, 4, of canvas or other suitable material is stitched to the under side of the body member of the insole in the same manner that this is now done in the case of a built-up insole. Then, in order to conceal the stitching, 5, where it emerges on the upper side of the body member, I place on the upper side of the body member a covering or protecting member which, in the arrangement shown, is made of two very thin layers or sheets, 6 and 7, of wood, between which is a layer of fabric, 8. If desired, a reinforcement, made up of fine wires, 9, may be woven into the fabric, 8. In the arrangement shown, the grain of the wood in the layers 6 and 7 is transverse while the wires in the fabric are longitudinal. This permits the veneer sheets to be made very thin without leaving the covering layer or member weak.

The covering member may be glued upon the body of the insole or it may simply be laid in place.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. An insole made of a body member of laminated wood veneer, a welt-attaching lip stitched to the under side thereof, and a covering layer of wood for the stitches arranged on the upper side of the body member.

2. An insole comprising a flexible body of laminated wood veneer composed of layers united by moisture-proof glue, a welt-attaching lip secured to the under side thereof, and a flexible covering layer of wood arranged upon the upper side of said body member and covering the exposed stitches.

3. An insole comprising a body member of laminated wood veneer, a welt-attaching lip secured to the under side of the body member by fastening means extending through the body member, and a covering layer of wood arranged upon the upper side of said body member.

4. An insole comprising a body member of laminated wood veneer, a welt-attaching lip secured to the under side of the body member by fastening means extending through the body member, and a covering layer for said fastening means arranged on the upper side of said body member and comprising thin sheets of wood and fabric.

5. An insole member comprising two very thin sheets of wood having the grain extending transversely, and an interposed layer of fabric containing fine wires extending longitudinally of the insole.

In testimony whereof, I sign this specification.

HENRY L. HASKELL.